(12) United States Patent
Jatzke (10) Patent No.: US 7,862,275 B2
(45) Date of Patent: Jan. 4, 2011

(54) FASTENING DEVICE

(75) Inventor: Stefan Jatzke, Ebertsheim (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 80 days.

(21) Appl. No.: 12/069,650

(22) Filed: Feb. 12, 2008

(65) Prior Publication Data

US 2008/0219758 A1  Sep. 11, 2008

(30) Foreign Application Priority Data

Feb. 13, 2007  (DE) .................. 20 2007 002 071

(51) Int. Cl.
*F16B 13/06* (2006.01)
(52) U.S. Cl. .......................... 411/45; 411/48
(58) Field of Classification Search .............. 411/45–48
See application file for complete search history.

(56) References Cited

U.S. PATENT DOCUMENTS

| | | | | |
|---|---|---|---|---|
| 5,641,255 | A * | 6/1997 | Tanaka | 411/48 |
| 5,775,860 | A * | 7/1998 | Meyer | 411/46 |
| 5,846,040 | A * | 12/1998 | Ueno | 411/45 |
| 6,039,523 | A * | 3/2000 | Kraus | 411/48 |
| 6,264,393 | B1 | 7/2001 | Kraus | |
| 6,979,162 | B2 * | 12/2005 | Kato | 411/371.1 |
| 7,105,119 | B2 * | 9/2006 | Kanie et al. | 264/238 |
| 2004/0052609 | A1 | 3/2004 | Kraus | |
| 2004/0109737 | A1 | 6/2004 | Kato | |
| 2004/0175250 | A1 | 9/2004 | Yoneoka | |
| 2004/0223826 | A1 | 11/2004 | Leon et al. | |

FOREIGN PATENT DOCUMENTS

| | | |
|---|---|---|
| CN | 1526962 | 3/2004 |
| CN | 1493793 | 5/2004 |
| CN | 1550681 | 12/2004 |
| DE | 29810437 | 11/1998 |
| DE | 20017376 | 3/2001 |
| DE | 10064017 | 5/2002 |
| DE | 69428588 | 6/2002 |
| EP | 0921323 | 6/1999 |

\* cited by examiner

*Primary Examiner*—Gary Estremsky
(74) *Attorney, Agent, or Firm*—Tarolli, Sundheim, Covell & Tummino LLP

(57) ABSTRACT

A fastening device for fastening a plate element, in particular a door or wall lining, on a carrier, in particular a body part of a motor vehicle, can take a preassembly position and a final assembly position. The fastening device includes a connecting element (10), which can be connected with the plate element and defines an axial mounting direction (A). The fastening device further comprises an engaging part (12) for locking the fastening device behind an opening of the carrier. Both the connecting element (10) and the engaging part (12) have integrally formed functional elements, which in the preassembly position directly cooperate with associated functional elements or regions of the engaging part (12) and with associated functional elements or regions of the connecting element (10), respectively.

14 Claims, 11 Drawing Sheets

FASTENING DEVICE

TECHNICAL FIELD

The invention relates to a fastening device for fastening a plate element, in particular a door or wall lining, on a carrier, in particular a body part of a motor vehicle.

BACKGROUND OF THE INVENTION

Such fastening devices are used to create a reliable and rather tight connection between a carrier (body part) and a plate element (door or wall lining).

From German Utility Model DE 298 10 437 U1, a fastening device made of plastics is known, which can take a preassembly position and a final assembly position. The fastening device is composed of four components: a connecting element with an upper part to be attached to the plate element and a lower part to be connected with the carrier; an engaging part to be embedded in an opening of the carrier, through which extends a neck-shaped intermediate region with latching elements, which is provided between the upper part and the lower part; an intermediate part (sleeve part) surrounding the intermediate region above the carrier, which can be locked with the latching elements and with the engaging part; and a sealing element disposed between the sleeve part and the engaging part, which acts upon the upper side of the carrier.

For a precise adjustment of the retraction and withdrawal forces during assembly or disassembly, German Utility Model DE 200 17 376 U1 proposes a fastening device with a similar structure. In the preassembly position a first region and in the final assembly position a second region of the latching elements is locked with counterlatching elements of the intermediate part. In the final assembly position the spreading elements of the engaging part at the same time are spread in the vicinity of the opening of the body part by a terminal region of the connecting element. In addition, a fifth component is provided, namely a cap locked with the lower part of the connecting element. In the preassembly position, the peripheral regions of the cap enclose the lower outer portions of the spreading elements of the engaging part, so that the fastening device can be inserted in the carrier opening. Upon final assembly, the aforementioned portions of the spreading elements are located behind the carrier opening away from the peripheral surface of the cap and thus provide for locking the fastening device in the carrier opening.

It is an object of the invention to create a fastening device with a simple structure, which is easy to assemble and provides for easy mounting.

SUMMARY OF THE INVENTION

The fastening element according to the invention is for fastening a plate element, in particular a door or a wall lining, on a carrier, in particular a body part of a motor vehicle. The fastening device can take a preassembly position and a final assembly position. The fastening device comprises a connecting element, which can be connected with the plate element and defines an axial mounting direction. The fastening device further comprises an engaging part for locking the fastening device behind an opening of the carrier. Both the connecting element and the engaging part have integrally formed functional elements, which in the preassembly position directly cooperate with associated functional elements or regions of the engaging part and with associated functional elements or regions of the connecting element, respectively. The invention is based on the finding that the number of components of the initially mentioned fastening devices can be reduced when certain functions, which have been accomplished hitherto by separate components, can be performed exclusively by the connecting element and the engaging part. For this purpose, the invention provides to integrally form functional elements on the connecting element and on the engaging part, which interact with suitable functional elements or regions of the respective other part. This measure allows to omit additional components such as the cap or the intermediate part necessary with the fastening device according to DE 200 17 376 U1. Thereby, not only the manufacturing costs of the components, but also the possibilities for making mistakes during assembly of the fastening device can be reduced.

In accordance with a first aspect of the invention, the functional elements formed integrally on the connecting element include holding elements, and the associated functional elements of the engaging part include spreading elements. In the preassembly condition the holding elements hold the spreading elements in an unspread condition. The holding elements formed on the connecting element replace the otherwise necessary additional cap, which especially had to be mounted on the connecting element.

To provide for easy insertion of the fastening device in the opening of a carrier, it is provided that in the preassembly position the total diameter of the spreading elements is not greater than the total diameter of the holding elements.

This can be achieved in particular in that in the preassembly position the holding elements hold the spreading elements in retaining regions provided on the connecting element.

In a preferred embodiment of the invention, the holding elements include arrow segments disposed at the end of the connecting element. Such shape is optimally suited for the aforementioned purpose.

In accordance with a second aspect of the invention, the functional elements formed integrally on the engaging part include latching elements, and the associated functional region of the connecting element includes a first groove. The latching elements engage in the first groove in the preassembly position. Due to the arrangement of the latching elements directly on the engaging part, an intermediate part, on which the latching elements were formed in the known fastening devices, can be omitted. Therefore, it is not necessary to provide such intermediate part and connect it with the engaging part.

Preferably, the latching elements are formed on a cylindrical portion of the engaging part, so that they can directly engage in circumferential grooves of the connecting element, for example.

According to a preferred embodiment the fastening device further comprises a sealing element having a first sealing portion for axial sealing with respect to the carrier, a second sealing portion for axial sealing with respect to the plate element, and a third sealing portion for radial sealing with respect to the connecting element.

The sealing element and the engaging part preferably are designed such that the sealing element is supported by a disk-shaped portion of the engaging part.

DETAILED DESCRIPTION OF THE PREFERRED EMBODIMENTS

Figure 1:
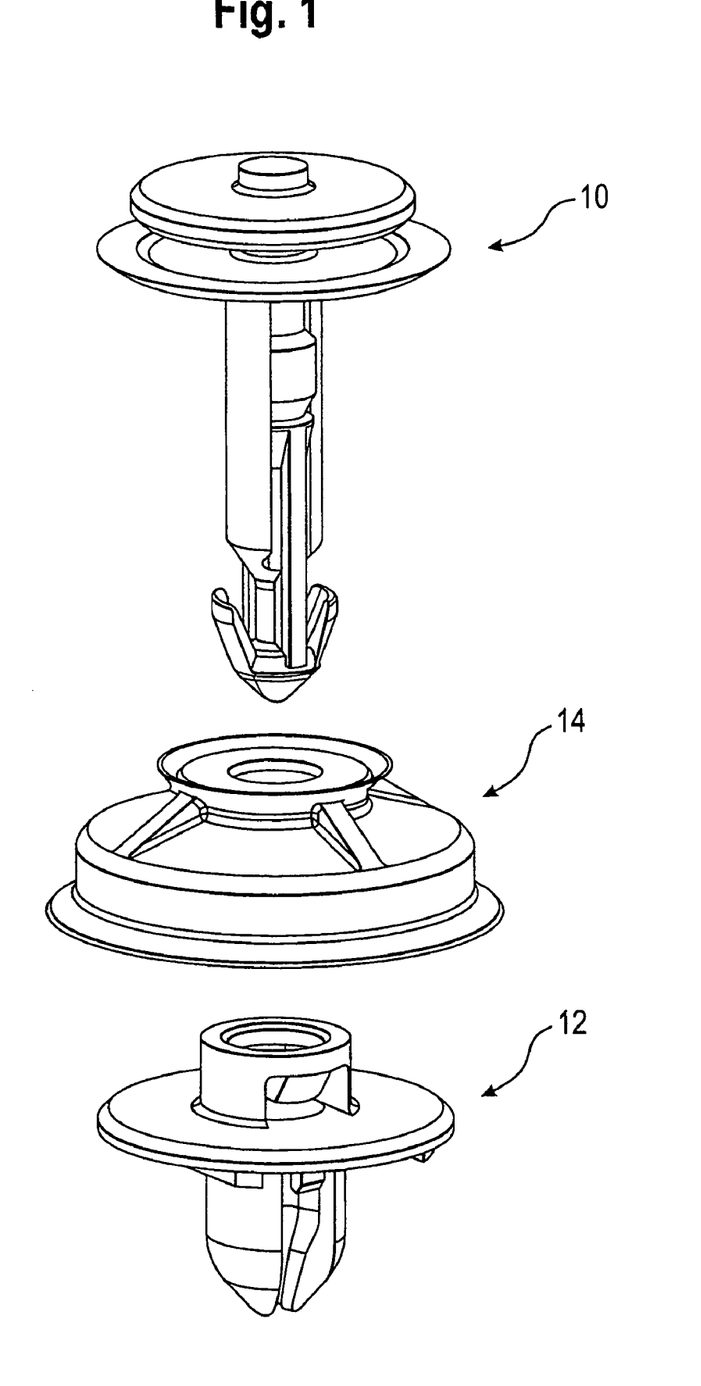
FIG. 1 shows an exploded perspective view of a fastening device of the invention.
Figure 2:
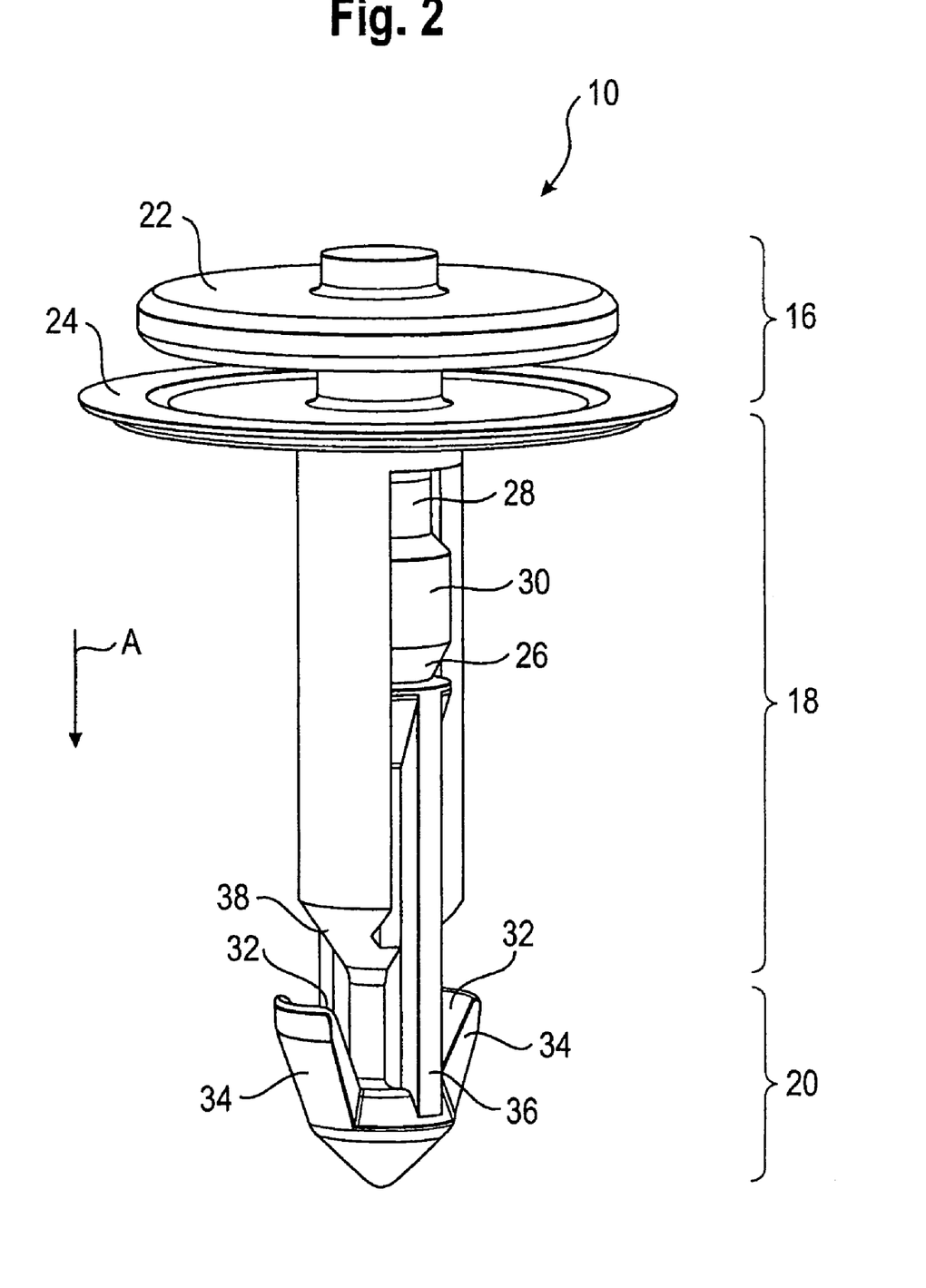
FIG. 2 shows the connecting element of the fastening device in a perspective view.
Figure 3:
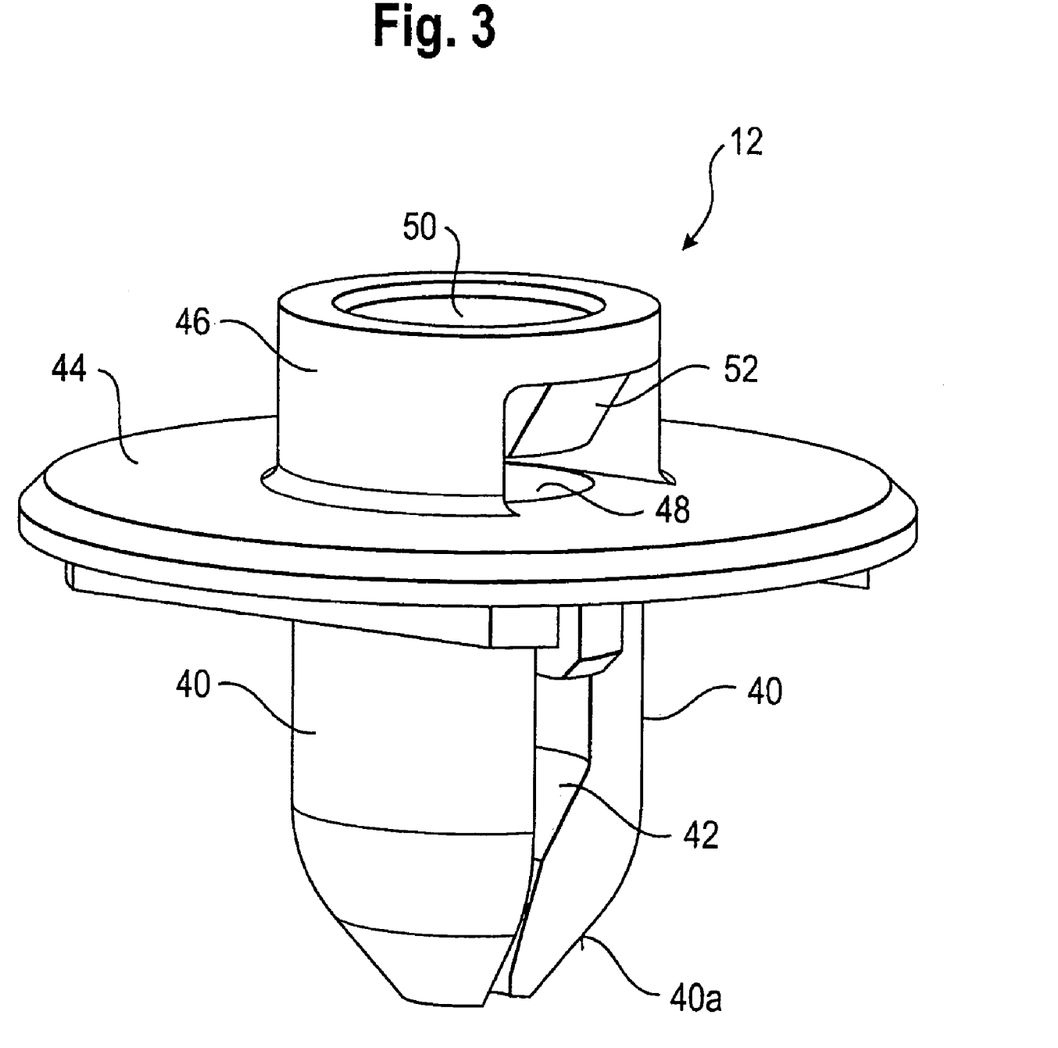
FIG. 3 shows the engaging part of the fastening device in a perspective view.
Figure 4:
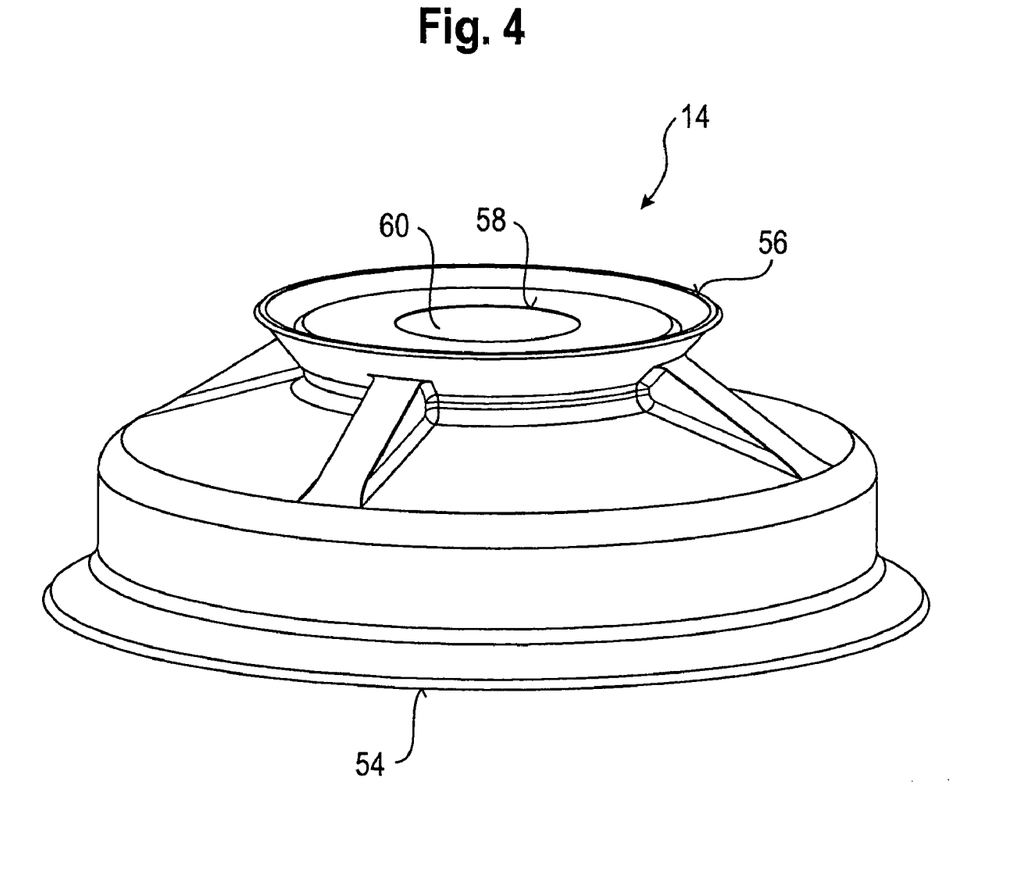
FIG. 4 shows the sealing part of the fastening device in a perspective view.

The fastening device shown in FIG. 1 is particularly suited for fastening a door or wall lining to a body part of a motor vehicle. The fastening device consists of a connecting element 10, an engaging part 12 and an (optional) sealing element 14, which are each made of plastics and are individually shown in detail in FIGS. 2, 3 and 4, respectively. Further components are not necessary for the fastening device.

The connecting element 10 (FIG. 2) defines an axial mounting direction A and can be divided into an upper part 16, an intermediate part 18 and a lower part 20. The upper part 16 includes two axially spaced radial flanges 22, 24, which can be inserted into a locking part or retainer (not shown) of the lining to be fastened. The intermediate part 18 has two circumferential grooves 26, 28, which are separated from each other by an intermediate neck 30. The lower part 20 includes retaining regions 32 for spreading elements 40 of the engaging part 12. The retaining regions 32 are defined by holding elements, in particular arrow segments 34, integrally formed at the end of the lower part 20. The retaining regions 32 are separated from each other by webs 36. In upward direction, a conically flared portion 38 for spreading the spreading elements 40 of the engaging part 12 adjoins the retaining regions 32.

The engaging part 12 (FIG. 3) has a plurality of opposed function elements, in particular spreading elements 40, which are conically tapered and are separated from each other by slots 42. In the illustrated embodiment, two spreading elements 40 separated by one slot 42 are provided. A disk-shaped portion 44 and a cylindrical portion 46 adjoin the spreading elements 40. Both the disk-shaped portion 44 and the cylindrical portion 46 each have a central opening 48, 50 for the passage of the connecting element 10. The cylindrical portion 46 furthermore includes latching elements 52 directed radially to the inside, which serve as functional elements as will be explained later.

The sealing element 14 (FIG. 4) includes a first sealing portion 54 for axial sealing with respect to the body part, a second sealing portion 56 for axial sealing with respect to the locking part of the lining, and a third sealing portion 58 for radial sealing with respect to the connecting element 10. Like the engaging part 12, the sealing element 14 also has a central opening 60 for the passage of the connecting element 10.

The fastening device is designed such that it can take a preassembly position and a final assembly position. The preassembly position corresponds to the condition of the fastening device as stored and delivered, whereas the final assembly condition ensures a safe attachment of the lining to the body part upon assembly.

Figure 5:
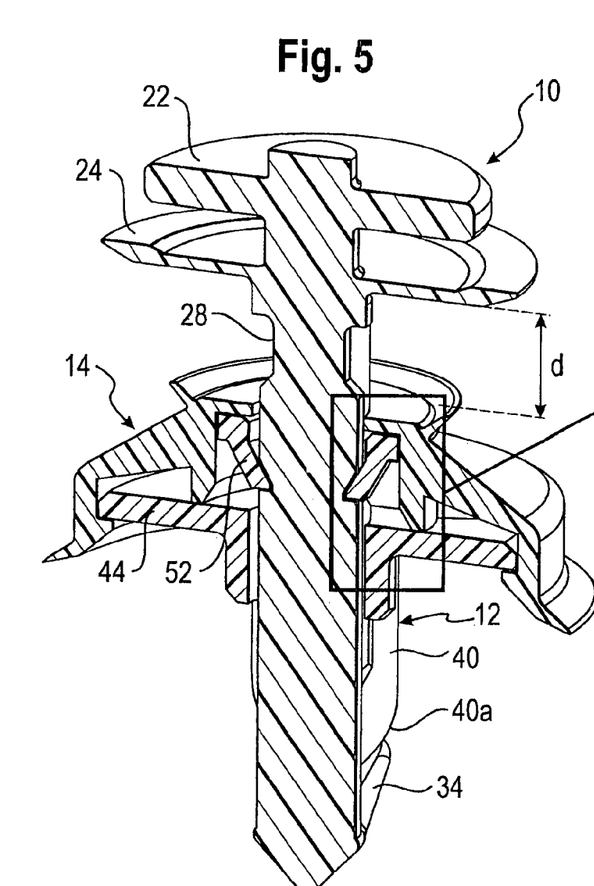
FIG. 5 shows a perspective sectional view of the fastening device of FIG. 1 in the preassembly position.
Figure 5A:
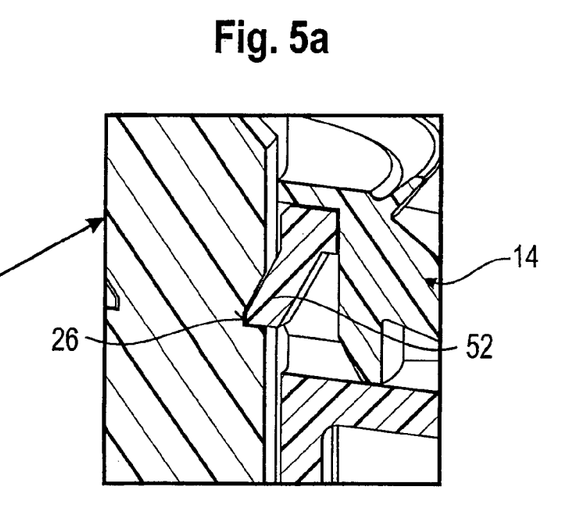
FIG. 5a shows an enlarged detail of FIG. 5.

The preassembly position of the fastening device is shown in FIG. 5. The sealing element 14 is placed on the engaging part 12 such that it is supported both by the disk-shaped portion 44 and by the cylindrical portion 46 of the engaging part 12. The connecting element 10 has been inserted through the central openings 48, 50, 60 to such an extent that the latching elements 52 of the engaging part 12 are locked in place in the first groove 26 of the connecting element 10 (see FIG. 5a), i.e. the first groove 26 serves as a functional region cooperating with the functional elements of the engaging part 12. The components of the fastening device thus are captively connected with each other and form a unit suitable for storage and transport.

Between the underside of the lower flange 24 of the connecting element 10 and the upper side of the sealing element 14, a distance d exists in the preassembly position. The spreading elements 40 of the engaging part 12 are located in the retaining regions 32 of the connecting elements 10, the conically tapered lower portions 40a of the spreading elements 40 being retained by the arrow segments 34 of the connecting element. Since the spreading elements 40 of the engaging part 12 in this condition are not yet spread, the fastening device can be inserted into the mounting hole of a body part in the preassembly position.

Figure 6:
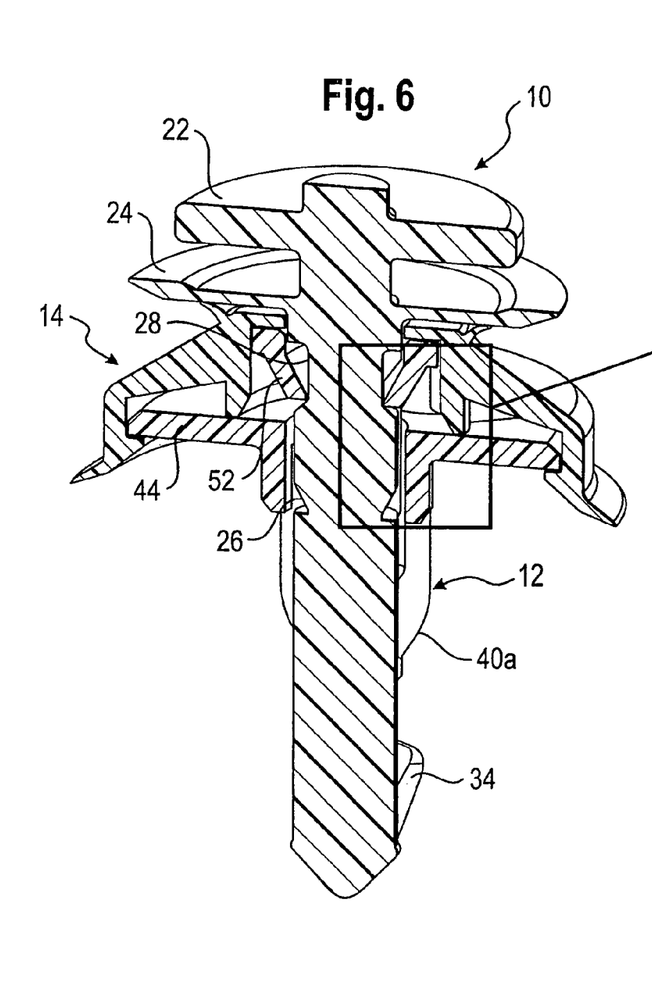
FIG. 6 shows a perspective sectional view of the fastening device of FIG. 1 in the final assembly position.
Figure 6A:
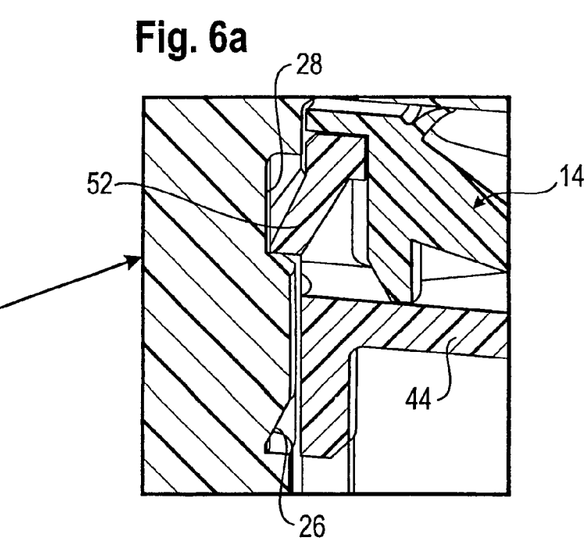
FIG. 6a shows an enlarged detail of FIG. 6.
Figure 7:
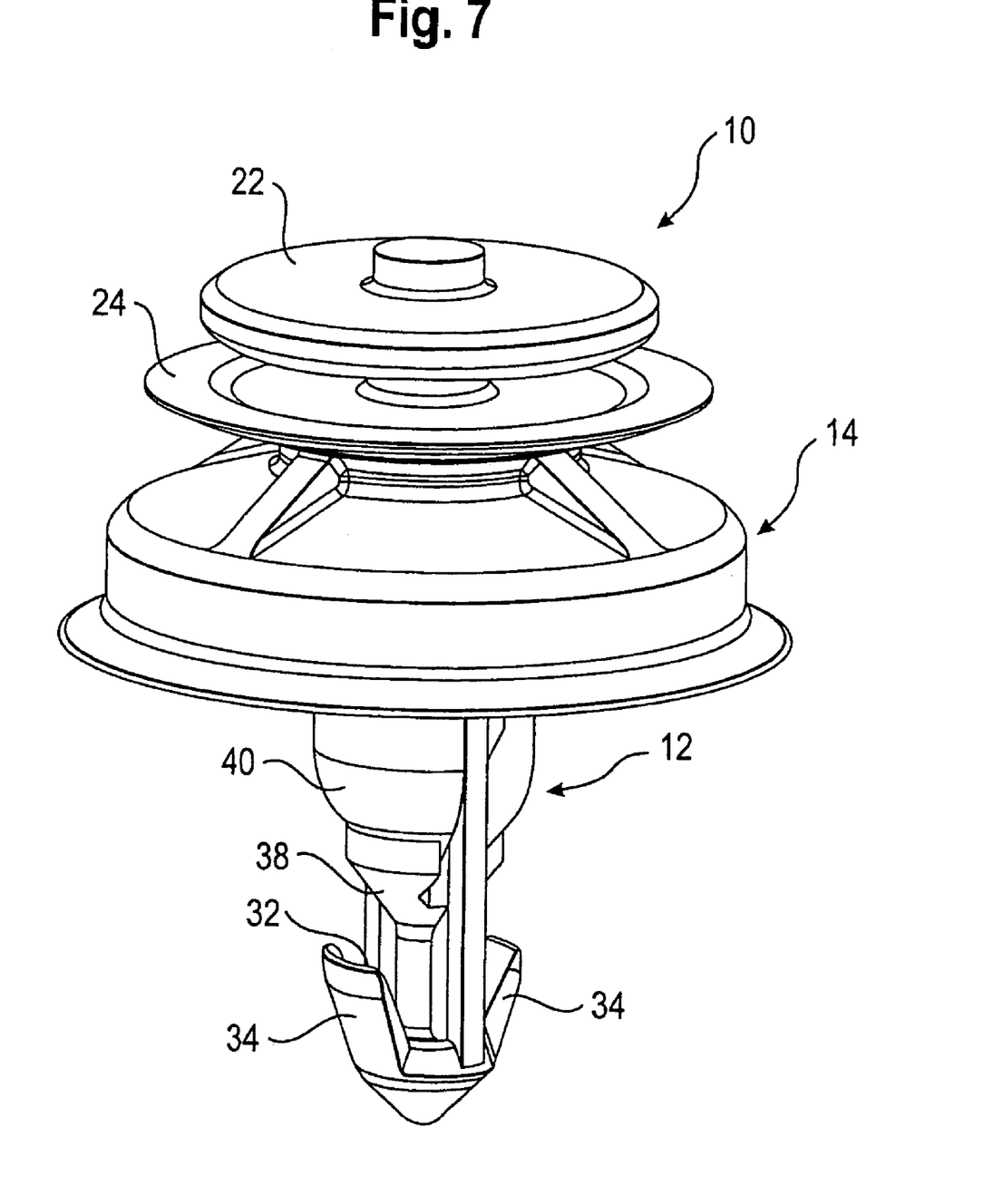
FIG. 7 shows the fastening device of FIG. 1 in the final assembly position in a perspective view.
Figure 8:
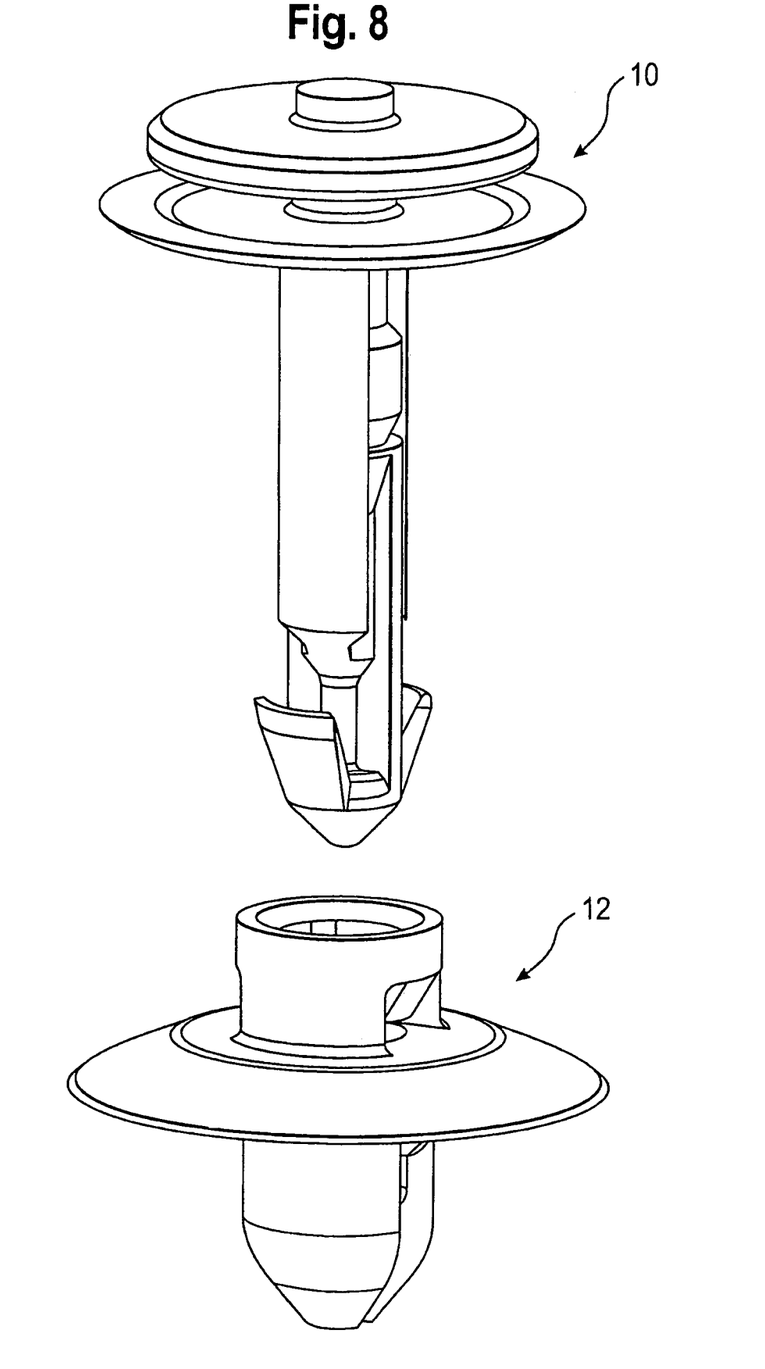
FIG. 8 shows an exploded perspective view of a fastening device of the invention according to another embodiment.

When a pressure now is exerted on the fastening device, in particular on the upper part 16 of the connecting element 10, in mounting direction A, the connecting element 10 will move in said direction upon overcoming the holding force of the latching elements 52, until the latching elements 52 come in engagement with the second groove 28 of the connecting element 10, as shown in FIGS. 6 and 6a. At the same time, the spreading elements 40 of the engaging part 12 move out of the retaining regions 32 and are spread by the conical portion 38 of the connecting element 10 behind the opening of the body part. This corresponds to the final assembly position of the fastening device, which is shown again in FIG. 7. In this position, the entire fastening device is safely locked in the opening of the body part, so that a reliable attachment of the lining to the body part is ensured by the locking part retained between the flanges 22, 24. In this position, the sealing element 14 acts on the upper side of the body part and thus seals the opening of the body part. Like in the preassembly position, the components 10, 12, 14 of the fastening device are reliably connected with each other.

When the fastening device is to be disassembled again, a tensile force must be exerted on the locking part of the lining. As a result thereof, the latching elements 52 of the engaging part 12 move out of the second groove 28 of the connecting element 10 and get into the first groove 26. At the same time, the spreading of the spreading elements 40 is terminated, and the spreading elements 40 again are embedded in the retaining regions 32 of the connecting element 10. The entire fastening device thus can be withdrawn from the opening of the body part, as in this condition the maximum total diameter of the spreading elements 40 is not greater than the maximum diameter of the arrow segments 34 of the connecting element 10.

Figure 9:
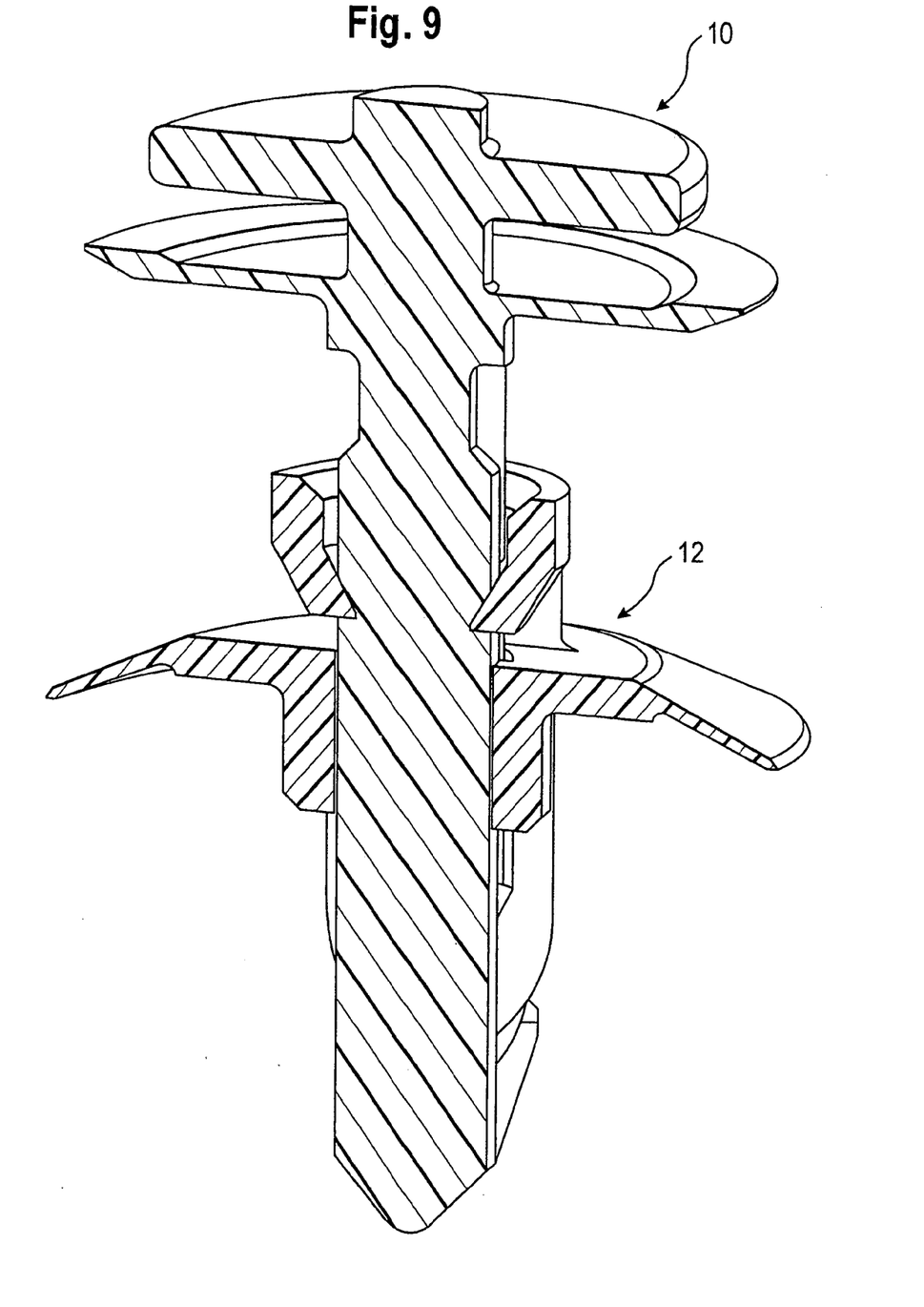
FIG. 9 shows a perspective sectional view of the fastening device of FIG. 8 in the preassembly position.
Figure 10:
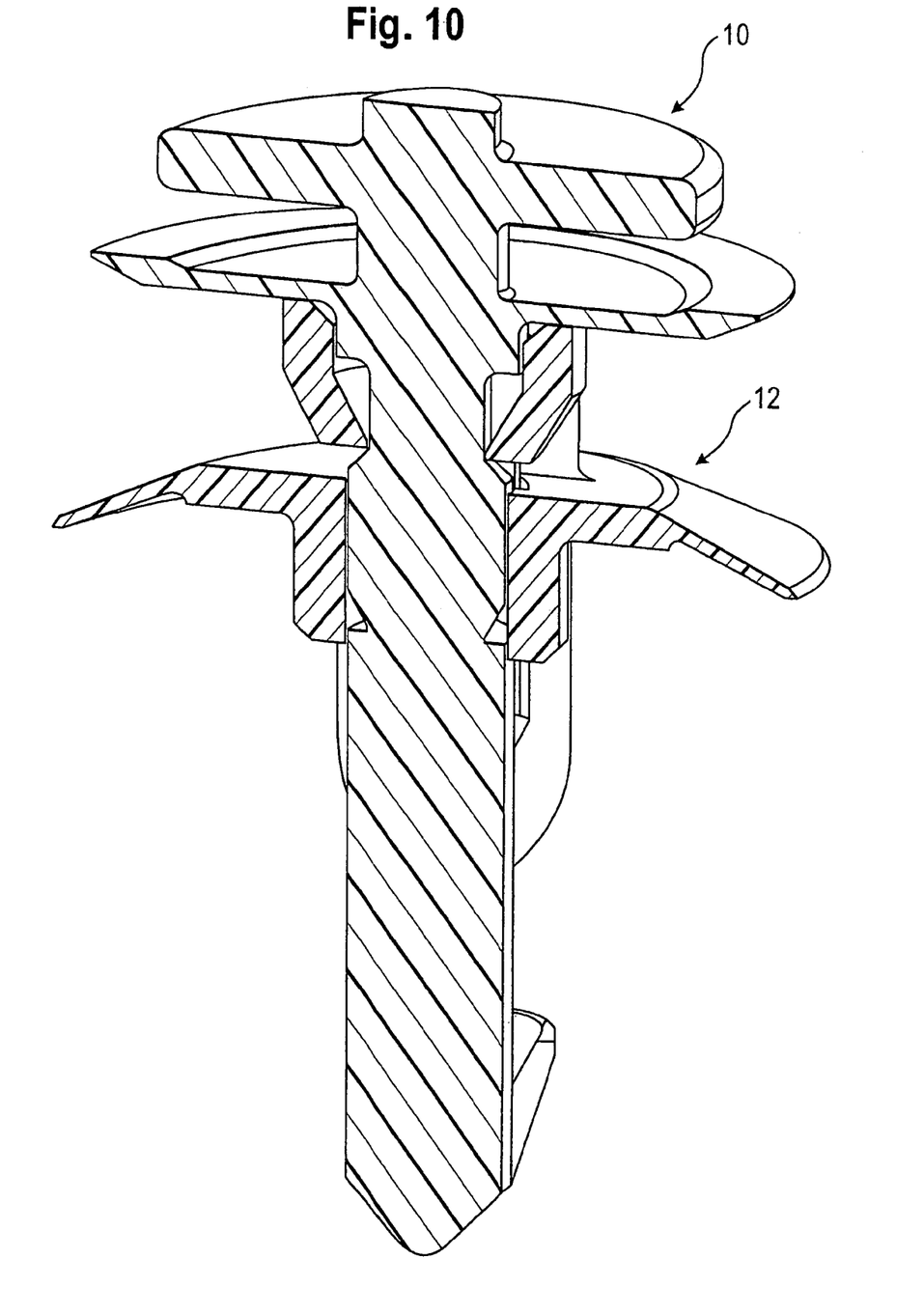
FIG. 10 shows a perspective sectional view of the fastening device of FIG. 8 in the final assembly position.
Figure 11:
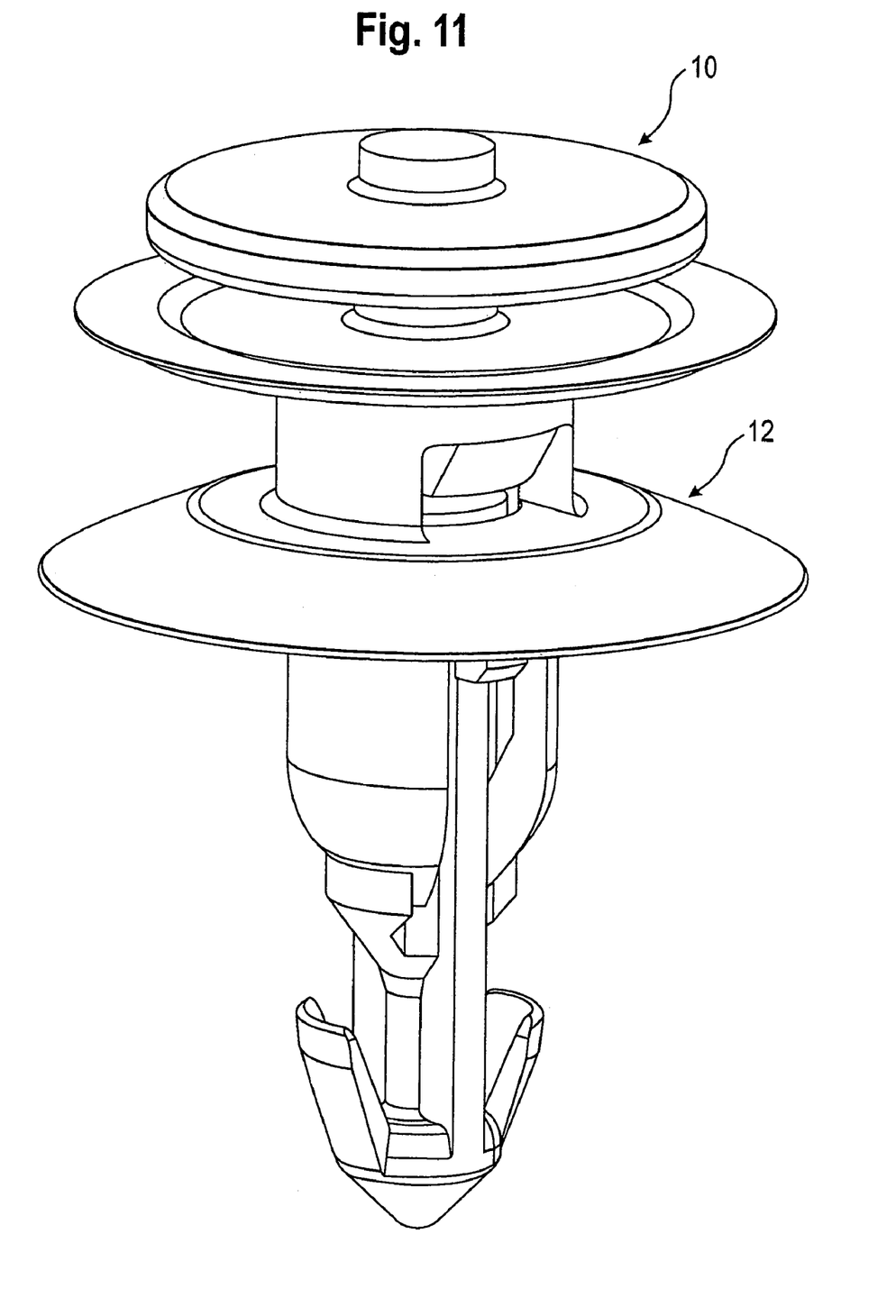
FIG. 11 shows the fastening device of FIG. 8 in the final assembly position in a perspective view.

FIGS. 8 to 11 show another embodiment of the invention. This embodiment substantially distinguishes from the one described above only in that the sealing element is dispensed with. Design and function of the connecting element 10 and the engaging part 12 are the same as in the embodiment described above. Details of the assembly are apparent from FIGS. 9 to 11 showing the preassembly position (FIG. 9) and the final assembly position (FIGS. 10 and 11).

The invention is not restricted to the described application. Rather, a variety of possible applications of the fastening device of the invention in different technical fields are conceivable.

The invention claimed is:

1. A fastening device for fastening a plate element on a carrier, wherein the fastening device can take a preassembly position and a final assembly position, the fastening device comprising a connecting element, which can be connected with the plate element and defines an axial mounting direction, and an engaging part into which the connecting element is inserted for locking the fastening device behind an opening of the carrier, the connecting element having functional elements formed as one piece with the connecting element, which in the preassembly position directly cooperate with associated functional elements or regions formed as one piece with the engaging part, the engaging part having functional elements formed as one piece with the engaging part, which in the preassembly position directly cooperate with associated functional elements or regions formed as one piece with the connecting element, wherein the functional elements that are formed as one piece with the connecting element include holding elements, and the associated functional elements of the engaging part include spreading elements, the holding elements holding the spreading elements in an unspread condition in the preassembly position, wherein a radially inner side surface of one of the holding elements engages a radially outer side surface of one of the spreading elements to hold the spreading element in the unspread condition in the preassembly position, the holding elements being disengaged from the spreading elements in the final assembly position, the holding elements maintaining the same radial position relative to a longitudinal axis of the connecting element whether the fastening device is in the preassembly position or the final assembly position.

2. The fastening device as claimed in claim 1, wherein in the preassembly position a total diameter of the spreading elements is not greater than a total diameter of the holding elements.

3. The fastening device as claimed in claim 1, wherein the holding elements include arrow segments disposed at an end of the connecting element.

4. The fastening device as claimed in claim 1, wherein the holding elements hold the spreading elements in retaining regions provided on the connecting element in the preassembly position.

5. The fastening device as claimed in claim 1, wherein the functional elements that are formed as one piece with the engaging part include latching elements, and the associated functional region of the connecting element includes a first groove, the latching elements engaging in the first groove in the preassembly position.

6. The fastening device as claimed in claim 5, wherein the latching elements are formed on a cylindrical portion of the engaging part.

7. The fastening device as claimed in claim 1, further comprising a sealing element that is a separate piece from the engaging part, said sealing element being placed on the engaging part, said sealing element having a first sealing portion for axial sealing with respect to the carrier, a second sealing portion for axial sealing with respect to the plate element, and a third sealing portion for radial sealing with respect to the connecting element.

8. The fastening device as claimed in claim 7, wherein the sealing element is supported both by a disk-shaped portion of the engaging part and a cylindrical portion of the engaging part.

9. The fastening device as claimed in claim 1, wherein in the preassembly position of the fastening device, the holding elements do not allow a spreading of the spreading elements in a radial outward direction with respect to the direction of movement of the connecting device relative to the engaging part from the preassembly position to the final assembly position.

10. The fastening device as claimed in claim 1, wherein the connecting element extends through the engaging part in the preassembly position.

11. The fastening device as claimed in claim 1, wherein the holding element engages a conically tapered portion of the spreading element in the preassembly position.

12. A fastening device for fastening a plate element on a carrier, wherein the fastening device can take a preassembly position and a final assembly position, the fastening device comprising:

a connecting element, which can be connected with the plate element and defines an axial mounting direction, an engaging part for locking the fastening device behind an opening of the carrier, and a sealing element that is a separate piece from the engaging part, said sealing element being placed on the engaging part, said sealing element having a first sealing portion for axial sealing with respect to the carrier, a second sealing portion for axial sealing with respect to the plate element, and a third sealing portion which rests on a radial flange of the connecting element for radial sealing with respect to the connecting element, the connecting element having functional elements formed as one piece with the connecting element, which in the preassembly position directly cooperate with associated functional elements or regions formed as one piece with the engaging part, the engaging part having functional elements formed as one piece with the engaging part, which in the preassembly position directly cooperate with associated functional elements or regions formed as one piece with the connecting element, wherein the functional elements that are formed as one piece with the connecting element include holding elements, and the associated functional elements of the engaging part include spreading elements, the holding elements holding the spreading elements in an unspread condition in the preassembly position.

13. A fastening device for fastening a plate element to a carrier, wherein the fastening device can take a preassembly position and a final assembly position, the fastening device comprising:

a connecting element, which can be connected with the plate element and defines an axial mounting direction, the connecting element having a first functional element located at a first axial location along the connecting element, the connecting element having a second functional element located at a second axial location along the connecting element, the first and second functional elements being formed as one piece with the connecting element; and an engaging part into which the connecting element is inserted for locking the fastening device behind an opening of the carrier, the engaging part having a third functional element located at a first axial location along the engaging part, the engaging part having a fourth functional element located at a second axial location along the engaging part, the third and fourth functional elements being formed as one piece with the engaging part, the first functional element engaging the third functional element when the fastening device is in the preassembly position and the second functional element engaging the fourth functional element when the fastening device is in the preassembly position, the first functional element including holding elements and the third functional element including spreading elements, a radially inner side surface of one of the holding elements engaging a radially outer side surface of one of the spreading elements to hold the spreading element in the unspread condition in the preassembly position, the holding elements being disengaged from the spreading elements in the final assembly position, the holding elements maintaining the same radial position relative to a longitudinal axis of the connecting element whether the fastening device is in the preassembly position or the final assembly position.

14. The fastening device as claimed in claim 13, wherein the holding element engages a conically tapered portion of the spreading element in the preassembly position.

* * * * *